No. 868,034. PATENTED OCT. 15, 1907.
L. A. THORNBURG.
GLASS MELTING AND DRAWING APPARATUS.
APPLICATION FILED FEB. 2, 1906.
2 SHEETS—SHEET 1.
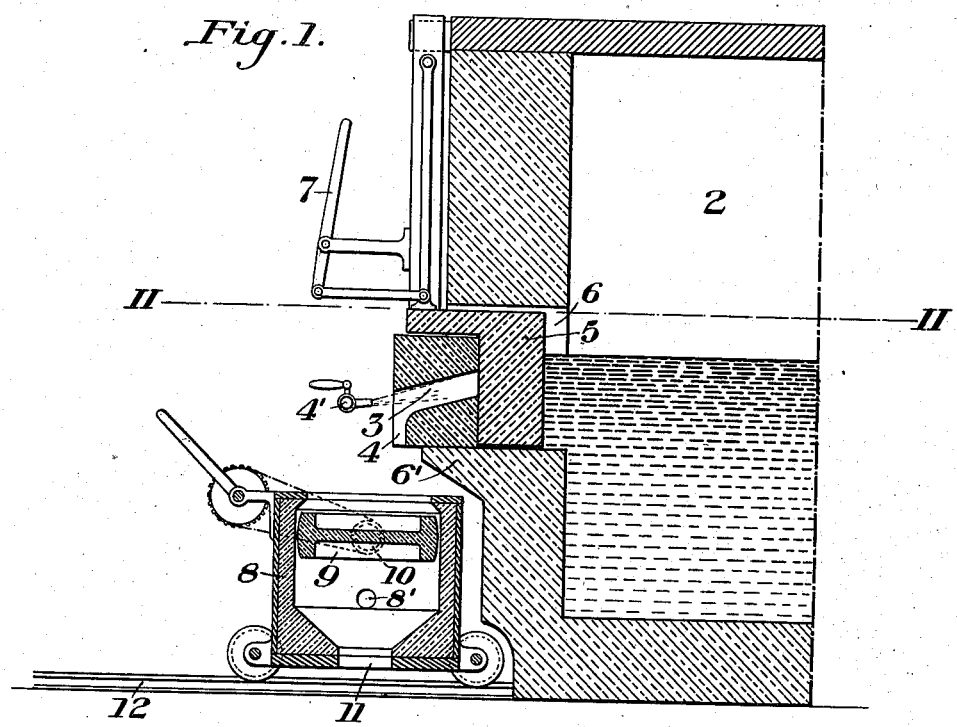
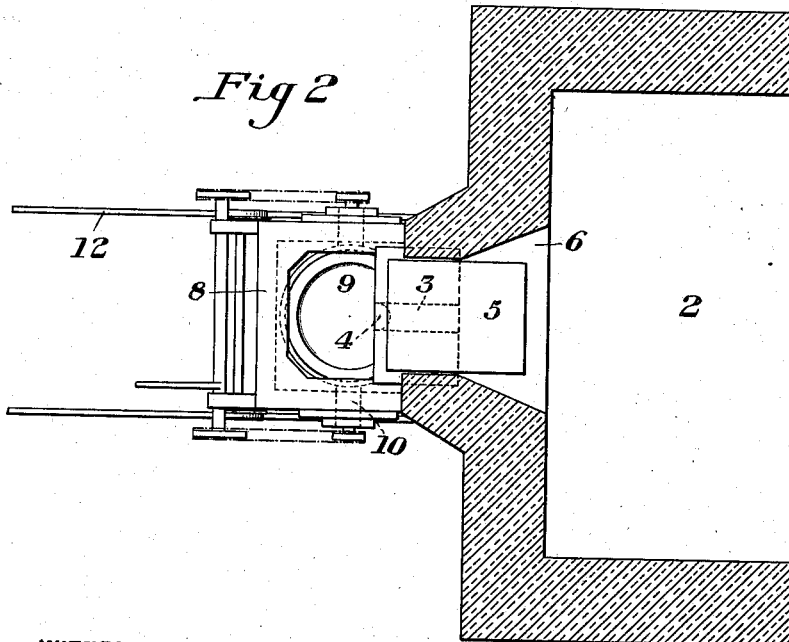
WITNESSES
R A Balderson
Warren W Swartz
INVENTOR
Lincoln A. Thornburg
by Bakewell & Byrnes
his attys

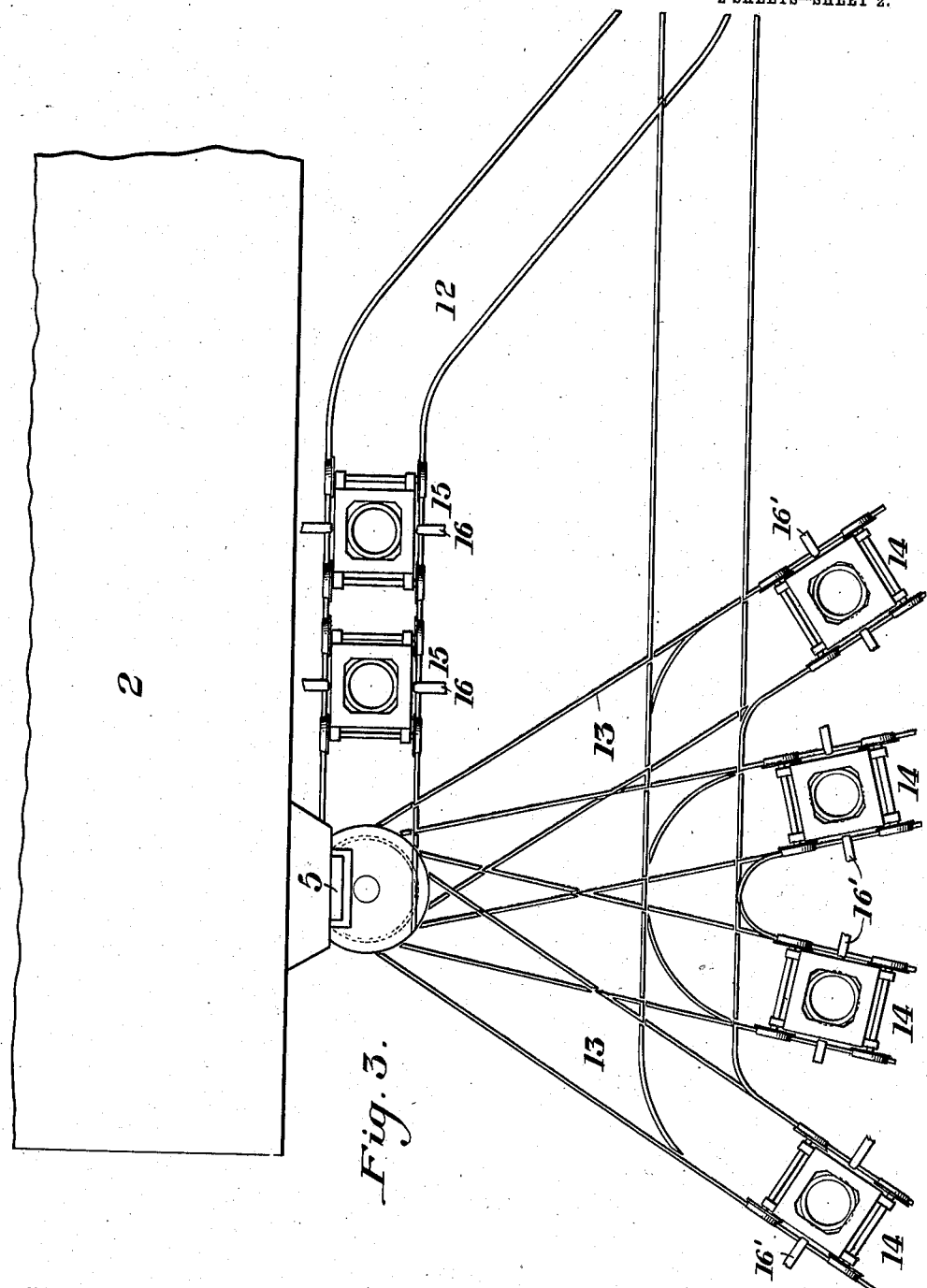

UNITED STATES PATENT OFFICE.

LINCOLN A. THORNBURG, OF HARTFORD CITY, INDIANA, ASSIGNOR TO WINDOW GLASS MACHINE COMPANY, OF PITTSBURG, PENNSYLVANIA, A CORPORATION OF NEW JERSEY.

GLASS MELTING AND DRAWING APPARATUS.

No. 868,034.    Specification of Letters Patent.    Patented Oct. 15, 1907.

Application filed February 2, 1906. Serial No. 299,189.

*To all whom it may concern:*

Be it known that I, LINCOLN A. THORNBURG, of Hartford City, Blackford county, Indiana, have invented a new and useful Glass Melting and Drawing Apparatus, of which the following is a full, clear, and exact description, reference being had to the accompanying drawings, forming part of this specification, in which—

Figure 1 is a vertical section of apparatus constructed in accordance with my invention; Fig. 2 is a section on the line II—II of Fig. 1; and Fig. 3 is a diagram plan view showing one form in which the apparatus can be arranged in relation to the furnace and drawing machines.

My invention provides means by which molten glass can be drawn directly from a melting tank into a pot and thence drawn in the form of sheets, cylinders, etc. It results in an important saving in labor and in cost of manufacture, and has other important advantages which will be appreciated by those skilled in the art.

The drawings show the preferred embodiment of my invention, but it may be modified in various ways.

In Figs. 1 and 2 of the drawings, 2 represents a melting pot or tank having an outlet 3 for molten glass which terminates in a downward extension or spout 4. It is adapted to be opened and closed by a stopper-block 5, preferably of fire-clay, which is adapted to slide in a flaring chamber 6, towards and from the outlet on a horizontal shelf 6', being actuated by a lever 7, or otherwise.

Below the spout 4 is a space to which a kiln or furnace 8 mounted on wheels and carrying a pot 9 at the top can be drawn. The pot is preferably reversible, being mounted on trunnions 10 and having a cavity or receptacle at both sides; and the kiln has an opening 11 for removal of the residue of glass discharged from the pot.

12 is a track on which the kilns can be moved to the furnace, and 13, 13, are tracks on which they can be moved from the furnace to the stations 14, where the glass is drawn from the pot by the machines.

15 indicates the melting-out stations on the return end of the track 12. While on the track at station 15 the kilns are brought into communication with suitable gas burners 16, by which heat is applied to the kiln through openings 8' in the sides thereof, and the residual glass is melted from the pot which is inverted for that purpose. The kilns carrying the pots are thence moved successively to the furnace, the stopper-block 5 is opened to permit the molten glass to flow into the pot, and the kiln with the pot is then moved to the drawing station at which there is also a burner or burners 16' to apply heat to the bottom of the pot. When the glass has been drawn from the pot the kiln is moved back to the stations 15 and the operation is repeated.

The tracks 13 are provided with suitable switches, so that a kiln with a pot thereon can be run from the furnace to any one of the drawing stations, and thence back to the furnace by way of the melting stations. 4' is a burner for melting chilled glass from the outlet 3 and spout 4.

The use of the stopper-blocks renders the molten glass easy to control and overcomes the difficulties which have heretofore prevented the tapping of molten glass from furnaces.

I claim:—

1. Apparatus for drawing glass, comprising a melting furnace having a discharge outlet, a movable pot adapted to receive molten glass therefrom, and a drawing station; substantially as described.

2. Apparatus for drawing glass, comprising a melting furnace having a discharge outlet, a movable pot adapted to receive molten glass therefrom, a melting-out station, and a drawing station; substantially as described.

3. Apparatus for drawing glass, comprising a melting furnace having a discharge outlet, a movable pot adapted to receive molten glass therefrom, a melting-out station, a drawing station, and a movable kiln by which the pot is carried; substantially as described.

4. Apparatus for drawing glass, comprising a melting furnace having a discharge outlet, a movable pot adapted to receive molten glass therefrom, a melting-out station, a drawing station, and a movable kiln by which the pot is carried, the pot being reversible; substantially as described.

5. Apparatus for melting and discharging molten glass, comprising a furnace provided with a glass outlet, and a horizontally movable stopper for the outlet situated between the outlet and the body of molten glass in the furnace; substantially as described.

6. Apparatus for melting and discharging molten glass, consisting of a furnace provided with a glass outlet, a horizontally movable stopper for the outlet situated between the outlet and the body of molten glass in the furnace, said stopper having a projecting portion extending through an opening in the furnace wall, and operating means connected to such extension; substantially as described.

7. Apparatus for drawing glass, comprising a melting furnace having a discharge outlet, a movable pot adapted to receive molten glass therefrom, a plurality of drawing stations, and a system of tracks leading from the furnace to the drawing stations and back to the furnace; substantially as described.

8. Apparatus for drawing glass, comprising a melting furnace having a discharge outlet, a movable kiln or furnace having a pot adapted to receive molten glass from the discharge outlet, and a drawing station; substantially as described.

9. Apparatus for melting and discharging molten glass, comprising a furnace provided with a glass outlet, and a horizontally movable stopper-block movable in a flaring space to and from the outlet; substantially as described.

In testimony whereof, I have hereunto set my hand.

his
    LINCOLN A. X THORNBURG.
         mark.

Witnesses:
 EDWARD WELSCH,
 ROBERT HINTON.